(12) United States Patent
Thompson et al.

(10) Patent No.: US 6,623,720 B2
(45) Date of Patent: Sep. 23, 2003

(54) TRANSITION METAL CARBIDES, NITRIDES AND BORIDES, AND THEIR OXYGEN CONTAINING ANALOGS USEFUL AS WATER GAS SHIFT CATALYSTS

(75) Inventors: Levi T. Thompson, Northville, MI (US); Jeremy Patt, Novi, MI (US); Dong Ju Moon, Ann Arbor, MI (US); Cory Phillips, Detroit, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 118 days.

(21) Appl. No.: 09/822,609

(22) Filed: Mar. 30, 2001

(65) Prior Publication Data

US 2002/0013221 A1 Jan. 31, 2002

Related U.S. Application Data

(60) Provisional application No. 60/193,553, filed on Mar. 31, 2000.

(51) Int. Cl.$^7$ .................................................. C01B 3/16
(52) U.S. Cl. ........................................ 423/656; 252/373
(58) Field of Search ...................... 252/373; 423/655, 423/656; 502/200, 204, 207, 180, 184, 185, 182, 305, 313, 314, 315, 316, 321, 345, 338

(56) References Cited

U.S. PATENT DOCUMENTS

| 3,666,682 A | 5/1972 | Muenger ................ 252/373 |
| 3,974,096 A | 8/1976 | Segura et al. ............ 252/439 |
| 4,172,808 A | 10/1979 | Bohm et al. ............. 252/443 |
| 4,219,445 A | 8/1980 | Finch ..................... 252/443 |
| 4,271,041 A | 6/1981 | Boudart et al. .......... 252/438 |
| 4,325,842 A | 4/1982 | Slaugh et al. ............ 252/443 |
| 4,325,843 A | 4/1982 | Slaugh et al. ............ 252/443 |
| 4,789,534 A | 12/1988 | Laine ..................... 423/241 |
| 4,808,563 A | 2/1989 | Velenyi .................. 502/251 |
| 4,812,434 A | 3/1989 | Pohlmann et al. ....... 502/178 |
| 4,851,206 A * | 7/1989 | Boudart et al. .......... 423/409 |
| 5,039,503 A | 8/1991 | Sauvion et al. .......... 423/437 |
| 5,321,161 A | 6/1994 | Vreugdenhil et al. .... 564/490 |
| 5,444,173 A | 8/1995 | Oyama et al. ........... 585/671 |
| 5,468,370 A | 11/1995 | Ledoux et al. .......... 208/134 |
| 5,821,190 A | 10/1998 | Kurabayashi et al. .... 502/178 |

* cited by examiner

Primary Examiner—Stanley S. Silverman
Assistant Examiner—Maribel Medina
(74) Attorney, Agent, or Firm—Harness, Dickey & Pierce, P.L.C.

(57) ABSTRACT

Mono- and bimetallic transition metal carbides, nitrides and borides, and their oxygen containing analogs (e.g. oxycarbides) for use as water gas shift catalysts are described. In a preferred embodiment, the catalysts have the general formula of $M1_A M2_B Z_C O_D$, wherein M1 is selected from the group consisting of Mo, W, and combinations thereof; M2 is selected from the group consisting of Fe, Ni, Cu, Co, and combinations thereof; Z is selected from the group consisting of carbon, nitrogen, boron, and combinations thereof; A is an integer; B is 0 or an integer greater than 0; C is an integer; O is oxygen; and D is 0 or an integer greater than 0. The catalysts exhibit good reactivity, stability, and sulfur tolerance, as compared to conventional water shift gas catalysts. These catalysts hold promise for use in conjunction with proton exchange membrane fuel cell powered systems.

15 Claims, 1 Drawing Sheet

TRANSITION METAL CARBIDES, NITRIDES AND BORIDES, AND THEIR OXYGEN CONTAINING ANALOGS USEFUL AS WATER GAS SHIFT CATALYSTS

CROSS-REFERENCE TO RELATED APPLICATIONS

This application claims the benefit of U.S. Provisional Application No. 60/193,553 filed on Mar. 31, 2000, the disclosure of which is incorporated herein by reference.

STATEMENT OF GOVERNMENTAL SUPPORT

This invention was made with Government support under Grant No. DE-FC02-98EE50538 awarded by the Department of Energy. The Government has certain rights in this invention.

FIELD OF THE INVENTION

The present invention relates generally to fuel cells, and more particularly to transition metal carbides, nitrides and borides, and their oxygen containing analogs (e.g. oxycarbides) useful as water gas shift catalysts for use in producing hydrogen for chemical processing and petroleum refining, and reducing the carbon monoxide content of feeds to fuel cells.

BACKGROUND OF THE INVENTION

The water gas shift (WGS) is an important reaction in the conversion of fossil fuels into hydrogen for use in processing chemicals and refining petroleum. An important emerging application is in the production of hydrogen for fuel cells. Fuel cells electrochemically convert fuel and oxidant directly into electricity. Because of their inherent high efficiencies and low emissions, fuel cells have gained significant interest from automobile manufacturers and their suppliers. Many manufacturers favor the use of proton exchange membrane (PEM) fuel cells operating with hydrogen from the processing of fossil fuels. The key fuel processing steps are (1) steam reforming and/or partial oxidation and (2) water gas shift.

Hydrocarbon steam reforming and partial oxidation are the principal reactions used to generate hydrogen. Hydrocarbon steam reforming is highly endothermic and usually requires temperatures in excess of 700° C. to be effective (eqn. 1). Performance of the reformer is very sensitive to the composition of the fuel, consequently steam reforming is not considered to be very fuel flexible.

$$C_nH_m + nH_2O \rightarrow nCO + (n+m/2)H_2 \qquad \text{eqn. 1}$$

Hydrogen can also be extracted from hydrocarbons via partial oxidation reactions (see for example eqn. 2). Partial oxidation reactions are exothermic; however, because the reaction is not catalyzed, temperatures in excess of 1000° C. are required to achieve the necessary rates. The product composition is regulated by controlling the amount of $O_2$.

$$2C_nH_m + nO_2 \rightarrow 2nCO + mH_2 \qquad \text{eqn. 2}$$

In autothermal reforming, partial oxidation is coupled with steam reforming. The relative contribution of steam reforming versus partial oxidation can be controlled by choice of catalyst and operation conditions. For a given feed, the reaction temperature is lower than that for partial oxidation alone. Compared to steam reforming, autothermal reforming can be carried out in a smaller reactor volume, starts faster, and responds more quickly to control actions or changes in feed conditions.

The water gas shift reaction (eqn. 3) is well established for producing hydrogen and decreasing the CO content to less than 1%.

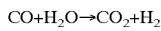

$$CO + H_2O \rightarrow CO_2 + H_2 \qquad \text{eqn. 3}$$

Carbon monoxide removal is critical because many catalysts are poisoned by CO. For example, the noble metal electrocatalysts in PEM fuel cells are susceptible to poisoning by as little as 10–100 ppm CO. The poisoning problem is exacerbated by the operating constraints imposed by commercial membrane materials. Present PEM fuel cells must be operated under conditions which avoid drying out the membrane. This essentially excludes operating the fuel cell at the higher temperatures where Pt oxidizes CO. The water gas shift reaction is typically carried out in two stages using Fe—Cr catalysts in the high temperature stage and Cu—Zn—Al catalyst in the low temperature stage.

Presently employed catalysts lack sufficient activity and durability for many portable and automotive applications. Furthermore, presently available catalysts are very sensitive to sulfur compounds, a common contaminant in modern transportation fuels.

Therefore, there exists a pressing need for water gas shift catalysts that are highly active, durable, and sulfur tolerant. These materials would be especially well suited for use in conjunction with PEM fuel cells for automotive applications.

BACKGROUND REFERENCES

U.S. Pat. No. 3,666,682 to Muenger, the entire specification of which is incorporated herein by reference, discloses a water gas shift conversion process in which a feed gas mixture is subjected to successive contacts with catalyst and the temperature of the reacting gases contacting the shift conversion catalyst is controlled by indirect concurrent heat exchange with the feed gas mixture.

U.S. Pat. No. 3,974,096 to Segura et al., the entire specification of which is incorporated herein by reference, discloses that hydrogen is produced by reacting carbon monoxide with steam at a temperature of at least 200° F. in the presence of a supported catalyst containing: (1) at least one alkali metal compound derived from an acid having an ionization constant below $1 \times 10^{-3}$, (2) a metallic hydrogenation-dehydrogenation material, and (3) a halogen moiety. The ratio of metal component to alkali metal compound, each calculated on the basis of the oxide thereof, ranges from 0.0001 to about 10 parts by weight per part by weight of the alkali metal compound. The halide constituent is present in amounts in excess of about 0.01 weight %, based on total catalyst. A preferred catalyst composition comprises potassium carbonate, a mixture of cobalt and molybdenum oxides and combined chlorine contained on an alumina support.

U.S. Pat. No. 4,172,808 to Böhm et al., the entire specification of which is incorporated herein by reference, discloses a process for the production of a tungsten carbide catalyst by carburization of tungsten oxides, comprises, directing a mixture of carbon monoxide and carbon dioxide over tungsten oxide while heating it in a heated reactor at a heating rate and gas flow rate such that the reduction of the tungsten oxide occurs more slowly than the diffusion of the carbon into the tungsten and into tungsten carbide which is formed during the reaction with the diffusion being faster than the separation of carbon from the gaseous phase according to the rate of adjustment of the Boudouard equilibrium. The carbon monoxide is charged at a rate of 560 l/h and the carbon dioxide is charged at a rate of 40 l/h and, after a reactor containing the sample of tungstic acid is positioned in a closed reactor, the reactor is flushed with the gases for around ten minutes and then placed into a muffle furnace. The reactor is heated to a temperature of 670° C. in the furnace and the temperature is then reduced to a reaction temperature of 620° C. First, all of the water is eliminated, and then there is a reduction of the tungsten oxides and a diffusion of the carbon into tungsten or into tungsten carbide which is formed. The reduction of the tungsten oxides occurs more slowly than the diffusion of the carbon, but faster than the deposition of the carbon from the gaseous phase.

U.S. Pat. No. 4,219,445 to Finch, the entire specification of which is incorporated herein by reference, discloses a process of preparing methane-containing gas comprising contacting carbon monoxide and hydrogen in the presence of a catalyst containing tungsten carbide. Various tungsten carbide-containing alumina gel catalysts are also disclosed.

U.S. Pat. No. 4,271,041 to Boudart et al., the entire specification of which is incorporated herein by reference, discloses a high specific surface area molybdenum oxycarbide catalyst. They are prepared by the vapor condensation of molybdenum hexacarbonyl and catalyze the reaction of hydrogen and carbon monoxide to form hydrocarbons. Carburization of the molybdenum oxycarbides increases their activity in the carbon monoxide-hydrogen reaction.

U.S. Pat. No. 4,325,842 to Slaugh et al., the entire specification of which is incorporated herein by reference, discloses a process for preparing a supported molybdenum carbide composition which comprises impregnating a porous support with a solution of hexamolybdenum dodecachloride, drying the impregnated support and then heating in a carbiding atmosphere at a temperature of about 650°–750° C.

U.S. Pat. No. 4,325,843 to Slaugh et al., the entire specification of which is incorporated herein by reference, discloses a process for preparing a supported tungsten carbide composition which comprises first forming a supported tungsten oxide composition, converting the oxide to the nitride by heating in an ammonia atmosphere, and then converting the nitride to the carbide by heating in a carbiding atmosphere.

U.S. Pat. No. 4,789,534 to Laine, the entire specification of which is incorporated herein by reference, discloses transition metal carbides in which the carbon is in excess and is covalently bound to the metal are produced by pyrolyzing transition metal amides that have two or more metal atoms, such as hexakis (dimethylamido) ditungsten or dimolybdenum.

U.S. Pat. No. 4,808,563 to Velenyi, the entire specification of which is incorporated herein by reference, discloses a catalyst which comprises a molybdenum-tungsten-containing complex represented by the formula $Mo_aW_bM_cA_dO_e$, wherein M is selected from the group consisting of one or more metals selected from any of Groups IB, IIB, IVB, VB or VIII of the Periodic Table and/or one or more of Y, Cr, Mn, Re, B, In, Ge, Sn, Pb, Th or U, or a mixture of two or more of the metals in said group; A is at least one metal selected from the group consisting of alkali metals, alkaline earth metals, Lanthanide series metals, La, Tl, or a mixture or two or more of the metals in said group; a is a number in the range of from about 1 to about 200; b is a number in the range of from about 1 to about 200; with the proviso that either Mo or W is in excess of the other, the ratio of a:b being about 4:1 or greater, or about 1:4 or less; c is a number such that the ratio of c:(a+b) is in the range of from 0:100 to about 10:100; d is a number such that the ratio of d:(a+b) is in the range of from 0:100 to about 75:100; and e is the number of oxygens needed to fulfill the valence requirements of the other elements. A process for converting gaseous reactants comprising methane and oxygen to higher order hydrocarbons using the foregoing catalyst is also disclosed.

U.S. Pat. No. 4,812,434 to Pohlmann et al., the entire specification of which is incorporated herein by reference, discloses an exhaust gas catalyst, wherein it consists of about 50 to about 95% by weight of silicon carbide and about 5 to about 50% by weight of an alloy of silicon with one or more metals of the group copper, iron, cobalt, nickel, chromium, vanadium, molybdenum, manganese, zinc, silver, platinum, palladium or other catalytically-active metals, the catalytically-active surface of which has optionally been activated by oxidation and/or chemical aftertreatment.

U.S. Pat. No. 4,851,206 to Boudart et al., the entire specification of which is incorporated herein by reference, discloses methods and compositions produced thereby concerning the preparation and use of high specific surface area carbides and nitrides. The carbides and nitrides can be obtained by thermal reduction of oxides in the presence of a source of carbon and nitrogen respectively, with relatively slow progressive temperature increases prior to completion of the reaction, followed by quenching. Novel metastable carbides can be obtained by carburization of nitrides having high surface area, which nitrides can be prepared by the above-described process.

U.S. Pat. No. 5,039,503 to Sauvion et al., the entire specification of which is incorporated herein by reference, discloses that carbon monoxide is reacted with water vapor and converted into hydrogen and carbon dioxide, in the presence of a thio-resistant catalyst which comprises an active phase deposited onto a support, said active phase comprising molybdenum, vanadium or tungsten, and a cobalt and/or nickel promoter therefor, and said support comprising cerium oxide or zirconium oxide. The reaction mixture includes carbon monoxide, hydrogen, water and compounds of sulfur, wherefrom hydrogen is selectively produced in increased amounts.

U.S. Pat. No. 5,321,161 to Vreugdenhil et al., the entire specification of which is incorporated herein by reference, discloses that nitrides can be hydrogenated to amines by heating the nitrile in the presence of hydrogen and a tungsten carbide catalyst, such as are formed by the calcination of a tungsten salt with an acyclic compound containing-nitrogen-hydrogen bonding.

U.S. Pat. No. 5,444,173 to Oyama et al., the entire specification of which is incorporated herein by reference, discloses bimetallic oxynitrides and nitrides which have catalytic properties comprise two transition metals selected from Groups IIIB to VIII of the Periodic Table of the Elements. Preferably, one metal is either molybdenum or tungsten. The other can be tungsten or molybdenum, respectively, or another transition metal, such as vanadium, niobium, chromium, manganese, cobalt, or nickel. They have a face centered cubic (fcc) arrangement of the metal atoms and have a surface area of no less than about 40 $m^2/gm$.

U.S. Pat. No. 5,468,370 to Ledoux et al., the entire specification of which is incorporated herein by reference, discloses a catalyst for chemical and petrochemical reactions and a process for its production. The catalyst comprises an oxide of one of the transition metals, rare earth elements, or actinide elements, e.g., molybdenum, having on its surface carbides and oxycarbides, the core being the metal or the metal oxide. In the process for catalyst production, the reaction gas mixture containing carbon products is passed onto the oxide, leading to a progressive carburization of the surface of the oxide and to a progressive increase in the efficiency of the catalyst.

U.S. Pat. No. 5,821,190 to Kurabayashi et al., the entire specification of which is incorporated herein by reference, discloses a catalyst and method for purifying exhaust gases, having superior performance of NOx purification to exhaust gases containing oxygen and nitrogen oxides, particularly superior performance of NOx elimination to exhaust gases from lean-burn engines with excess oxygen, and a wider effective temperature range of NOx elimination, and also superior heat resistance at high temperature. The catalyst for purifying exhaust gases comprises, as indispensable contents, iridium and alkaline metal loaded on a carrier which is at least one selected from metal carbide and metal nitride, or these and at least one element selected from the group consisting of alkaline earth metal elements and rare earth metal elements.

SUMMARY OF THE INVENTION

In accordance with one embodiment of the present invention, a catalyst for catalyzing the water gas shift reaction is provided, comprising the formula:

$$M1_A M2_B Z_C O_D$$

wherein M1 is a transition metal;

M2 is a transition metal;

A is an integer;

B is 0 or an integer greater than 0;

Z is selected from the group consisting of carbon, nitrogen, boron, and combinations thereof;

C is an integer;

O is oxygen; and

D is 0 or an integer greater than 0.

In accordance with another embodiment of the present invention, a catalyst for catalyzing the water gas shift reaction is provided, comprising the formula:

$$M1_A M2_B Z_C O_D$$

wherein M1 is selected from the group consisting of molybdenum, tungsten, and combinations thereof;

M2 is selected from the group consisting of iron, nickel, copper, cobalt, and combinations thereof;

A is an integer;

B is 0 or an integer greater than 0;

Z is selected from the group consisting of carbon, nitrogen, boron, and combinations thereof;

C is an integer;

O is oxygen; and

D is 0 or an integer greater than 0.

In accordance with another embodiment of the present invention, a method is provided for catalyzing the water gas shift reaction in which carbon monoxide levels in a hydrogen-containing stream are reduced, comprising:

providing a catalyst having the formula:

$$M1_A M2_B Z_C O_D$$

wherein M1 is a transition metal;

M2 is a transition metal;

A is an integer;

B is 0 or an integer greater than 0;

Z is selected from the group consisting of carbon, nitrogen, boron, and combinations thereof;

C is an integer;

O is oxygen;

D is 0 or an integer greater than 0; and exposing the hydrogen-containing stream to the catalyst for a sufficient period of time to reduce the carbon monoxide levels in the hydrogen-containing stream.

In accordance with another embodiment of the present invention, a method is provided for catalyzing the water gas shift reaction in which carbon monoxide levels in a hydrogen-containing stream are reduced, comprising:

providing a catalyst having the formula:

$$M1_A M2_B Z_C O_D$$

wherein M1 is selected from the group consisting of molybdenum, tungsten, and combinations thereof;

M2 is selected from the group consisting of iron, nickel, copper, cobalt, and combinations thereof;

A is an integer;

B is 0 or an integer greater than 0;

Z is selected from the group consisting of carbon, nitrogen, boron, and combinations thereof;

C is an integer;

O is oxygen;

D is 0 or an integer greater than 0; and exposing the hydrogen-containing stream to the catalyst for a sufficient period of time to reduce the carbon monoxide levels in the hydrogen-containing stream.

A more complete appreciation of the various embodiments and aspects of the present invention and the scope thereof can be obtained from a study of the accompanying drawings, which are briefly summarized below, the following detailed description of the invention, and the appended claims.

DETAILED DESCRIPTION OF THE PREFERRED EMBODIMENTS

Figure 1:
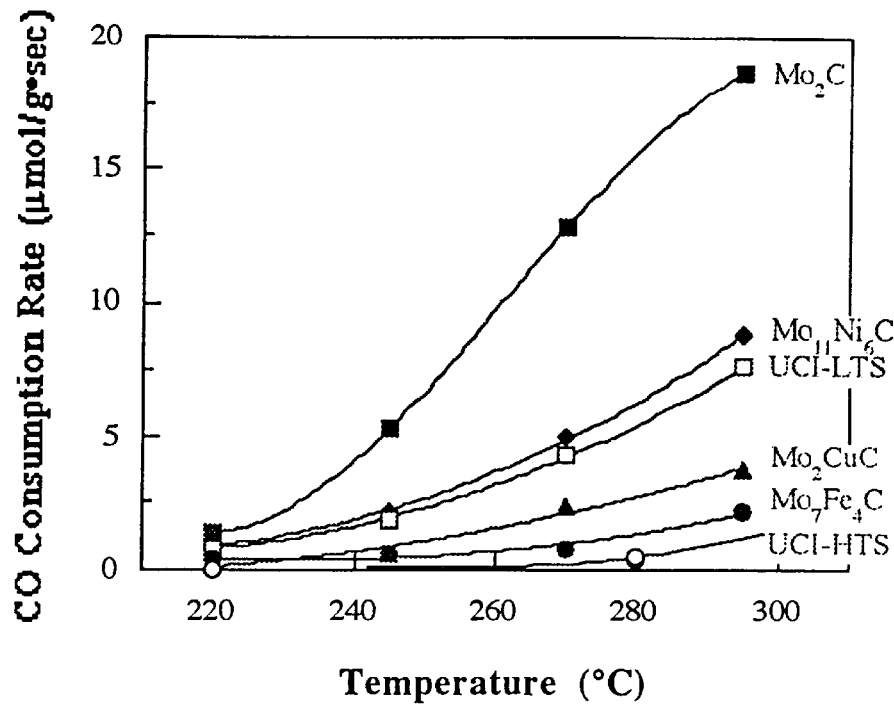
FIG. 1 is a graphical illustration showing the carbon monoxide consumption rates of several exemplary transition metal carbide water gas shift catalysts of the present invention as compared to several commercial water gas shift catalysts, in accordance with one aspect of the present invention.

In accordance with one embodiment of the present invention, mono- and/or bimetallic transition metal carbides, nitrides and borides, and their oxygen containing analogs (e.g. oxycarbides) are provided. These compounds are particularly useful as water gas shift catalysts for PEM fuel cells. Transition metals are generally defined as those elements found in Groups IIIB(3) through IIB(12) of the Periodic Table of the Elements.

In accordance with a preferred embodiment of the present invention, the mono- and/or bimetallic transition metal compounds have the general formula $M1_A M2_B Z_C O_D$, wherein M1 is selected from the group consisting of Mo, W, and combinations thereof; M2 is selected from the group consisting of Fe, Ni, Cu, Co, and combinations thereof; Z is selected from the group consisting of carbon, nitrogen, boron, and combinations thereof; A is an integer; B is 0 or an integer greater than 0; C is an integer; O is oxygen; and D is 0 or an integer greater than 0. It should be appreciated that the molar ratios of M1:M2 can vary quite considerably, as will be described herein. However, in a preferred embodiment, the molar ratio of M1:M2 is 1 or greater: 0 or greater.

The various transition metal carbides (TMC's), nitrides (TMN's) and borides (TMB'S), and their oxygen containing analogs of the present invention were synthesized from solid oxide precursors. For example, the TMC's were prepared as follows. The oxides were prepared from dried mixtures of ammonium and/or nitrate salts. These salts were dissolved in warm deionized water. The liquid was slowly evaporated and the remaining solid was calcined in dry air for 3 hrs at 500° C. and sieved to retain material with a mesh size of −60+230. The calcination temperature was determined via thermal gravimetric analysis (TGA).

The oxide was then carburized in a temperature programmed manner using an equimolar $CH_4/H_2$ mixture flowing at 50–300 $cm^3$/min. Typically, 1–4 g of the oxide was loaded on a quartz wool plug in a quartz straight tube reactor. Because graphitic carbon can block catalytically active sites, special care was taken to avoid deposition of excess carbon. Solid-state reaction pathways and appropriate final temperatures ($T_f$) were determined using TGA in conjunction with X-ray diffraction (XRD). Presence of the Group VIII metal caused a reduction in the temperature required to reduce then carburize the oxide. For example, the oxide containing Mo and Ni carburized at a temperature more than 50° C. lower than that required to carburize the Mo oxide. The addition of Cu also resulted in a substantial reduction in the temperature required to accomplish the first transformation. It should also be noted that the rate of carbon deposition is accelerated for materials containing the Group VIII metal.

Temperature programs used to synthesize the TMC's of the present invention consisted of linearly heating the oxide at a rate of 600° C./hr to 300° C., then at 60° C./hr to the final temperature ($T_f$). Following a 2 hr soak period, the product was quenched to room temperature and passivated for 4 hrs in a mixture of 1% $O_2$/He flowing at 30 $cm^3$/min. This passivation step was necessary to prevent pyrophoric oxidation of the carburized product upon contact with air. The final temperatures and bulk phases are summarized in Table I, below:

TABLE I

| Catalyst Formula | M1:M2 Molar Ratio | Main Oxide Phases | $T_f$ (° C.) | Phases Present | Surface Area ($m^2$/g) | Avg. Pore Size (nm) |
|---|---|---|---|---|---|---|
| $Mo_2C$ | 1:0 | $MoO_3$ | 615 | $Mo_2C$ | 61 | 3 |
| $Mo_7Fe_4C$ | 1.75:1 | $Fe_2(MoO_4)_3$ | 590 | $Mo_2C$, Fe, $MoO_2$ | 23 | 19 |
| $Mo_4Fe_7C$ | 1:1.72 | $Fe_2(MoO_4)_3$ | 548 | $Mo_2C$, Fe, $MoO_2$ | 32 | 24 |
| $Mo_{11}Ni_6C$ | 1.84:1 | $NiMoO_4$, $MoO_3$ | 571 | Mo—Ni carbide, Ni, $MoO_2$ | 87 | 8 |
| $Mo_{14}Ni_{23}C$ | 1:1.64 | $NiMoO_4$, MoO3 | 550 | Mo—Ni carbide, Ni, $MoO_2$ | 33 | 11 |
| $Mo_2CuC$ | 1.99:1 | $CuMoO_4$, $MoO_3$ | 620 | Cu, Unknown phase* | 44 | 8 |
| $Mo_2Cu_3C$ | 1:1.5 | $CuMoO_4$, $MoO_3$ | 620 | Cu, Unknown phase* | 28 | 5 |

*Pattern did not match any patterns in the Joint Committee on Powder Diffraction Standards (JCPDS) Tables.

The predominant phase in most of the materials was a carbide; however, some materials contained small amounts of metal and oxide. The diffraction pattern for the Mo formulation indicated phase pure $Mo_2C$.

The Brunner Emmet Teller (BET) surface areas and pore size distributions were determined by $N_2$ physisorption. Density Functional Theory was used to estimate the pore size distributions and average pore sizes. A summary of the results is provided in Table I.

Prior to measurement of the reaction rates, the catalysts were pretreated. Reduction temperatures for pretreatment of the catalysts were determined based on the results of temperature programmed reduction (TPR). A 100 mg sample of the catalyst was heated to 600° C. at 600° C./hr in 5% $H_2$/Ar while the effluent composition was monitored. Reduction at 400° C. appeared to be adequate for most of the carbides although optimization of the pretreatment conditions could result in substantial improvements in performance.

The water gas shift reaction rates and product selectivities were measured using synthetic $CH_4$ steam reformer exhaust mixtures. A 0.15 g sample of each catalyst was diluted with approximately 0.1 g of silica gel to attain a constant bed volume of 0.34 $cm^3$. The carbide catalysts were reduced at 400° C. for 4.5 hrs in $H_2$. Rates for commercial low temperature shift (LTS) (60 $m^2$/gr; Cu—Zn—Al from United Catalysts Inc.) and high temperature shift (HTS) (55 $m^2$/gr; Fe—Cr from United Catalysts Inc.) catalysts were also measured for comparison purposes. The LTS catalyst was reduced at 200° C. in 2% $H_2/N_2$ for 4.5 hrs per recommendations from the manufacturer. The HTS catalyst was reduced in a stream containing 55% $H_2$, 5% CO, 10% $CO_2$, 28% $H_2O$ and 3% $CH_4$ for 4.5 hrs at 370° C. Reaction rates were measured for temperatures between 200–400° C. The reactant gases were delivered by mass flow controllers and the deionized water was fed using a Rainin Rabbit HPLC pump. An SRI Model 8610C gas chromotograph equipped with Porapak Q and molecular sieve columns and a thermal conductivity detector was used to measure the reactant and effluent compositions. The total reactant flow rate was approximately 155 $cm^3$/min yielding gas hourly space velocities of approximately 25,000 $hr^{-1}$. The conversion was limited to 20% to simplify data analysis and avoid the equilibrium limit. The reaction rates reached steady-state after approximately 1 hr on stream and were reproducible to within 10% during subsequent runs. The blank run for a 0.34 cm$^3$ bed of silica gel showed no WGS activity. There was also no evidence of methanation activity for any of the catalysts under the conditions employed.

Reaction rates measured using a feed stream containing 62.5% H$_2$ (99.99% pure), 5.7% CO (99.5% pure) and 31.8% H$_2$O are shown in FIG. 1. Activities for the TMC catalysts were comparable or superior to those of commercial Fe—Cr (UCI-HTS) and Cu—Zn (UCI-LTS) catalysts. The most active carbide significantly outperformed the Cu—Zn catalyst.

The turnover frequency for the Mo$_2$C catalyst was estimated to be 0.05 sec$^{-1}$ at 270° C. based on site densities measured via O$_2$ chemisorption at −77° C. For comparison, the turnover frequency for the LTS catalyst was 0.04 sec$^{-1}$ at 270° C. (based on O$_2$ uptake). The oxygen uptake for the LTS catalyst yielded a Cu surface area of 11.5 m$^2$/g when the O$_2$ cross-sectional area was assumed to be approximately 0.2 nm$^2$/molecule. This surface area is nearly identical to that supplied by the manufacturer suggesting that this catalyst was properly pretreated.

The performance of the carbides was also compared to that of a Pd/CeO$_x$ catalyst (10 wt. % Pd and a surface area of 120 m$^2$/gr). This type of catalyst is reported to catalyze the WGS reaction with high rates (Bunluesin et al., 1998). The WGS rates were determined using a reactant gas containing 55% H$_2$, 5% CO, 10% CO$_2$, 28% H$_2$O and 3% CH$_4$. The Pd/CeO$_x$ catalyst was calcined at 600° C. for 12 hrs prior to the rate measurements. The results for measurements at 270° C. are summarized in Table II, below:

TABLE II

| Catalyst | Initial Rate ($\mu$mol/g·sec) | End-Run Rate ($\mu$mol/g·sec) | Activation Energy (kcal/mol) |
|---|---|---|---|
| Mo$_2$C | 5.5 | 7.1 | 17 |
| UCI-LTS | 3.6 | 3.1 | 16 |
| Pd/CeO$_x$ | 8.5 | 2.8 | 18 |

The initial CO consumption rate for the Pd/CeO$_x$ catalyst was very high; however, this material deactivated to a level lower than that of the carbide and LTS catalysts. Apparent activation energies observed for the Cu/Zn/Al LTS and Pd/CeO$_x$ catalysts are consistent with values reported in the literature (Mellor et al., 1997; Bunluesin et al., 1998).

Figure 2:
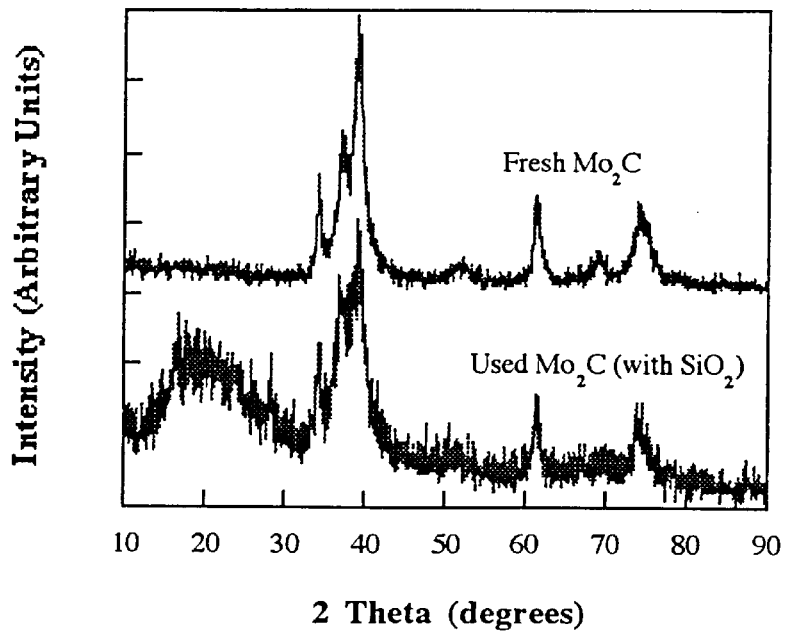
FIG. 2 is a graphical illustration showing the X-ray diffraction patterns for as-prepared $Mo_2C$ of the present invention and the same material after catalyzing the water gas shift at temperatures up to 400° C., in accordance with one aspect of the present invention.

Rates for the carbides were also measured after thermal cycling. In these experiments, the catalyst was maintained in the reactant mixture at room temperature overnight between cycles. Within experimental error, there was no deactivation for the TMC catalysts suggesting that these materials are very durable. X-ray diffraction patterns before and after use in the WGS reactor are illustrated in FIG. 2 for the Mo$_2$C catalyst.

Thus, the present invention has yielded a new class of WGS catalysts. These carbide-, nitride-, and boride-based catalysts are expected to reduce the PEM fuel cell fuel processor size and cost as a consequence of their exceptional activities and durabilities, and tolerance to sulfur. Improvements in catalyst activity may be secondary to the demonstration of poison tolerance. The sulfur content in streams produced via reformation of transportation fuels is expected to be 0.5–1 ppm. At these levels most metal catalysts rapidly deactivate. Catalyst beds employing Cu/Zn catalysts are typically designed to be 2.5–3 times larger than necessary due to sulfur poisoning. Consequently, a sulfur tolerant catalyst that is as active in the presence of sulfur as presently available Cu/Zn catalysts are in the absence of sulfur would yield at least a 50% reduction in bed size. By analogy, with high surface area Mo that is produced by reduction of MoO$_3$ with H$_2$, it is envisioned that costs for the bulk carbide powders will be low. Anticipated performance characteristics for the carbide catalysts of the present invention are compared to those for other candidate WGS catalysts in Table III, below:

TABLE III

| Performance Characteristic | Carbide Catalysts | Cu/Zn/Al Catalysts | Pd/CeO$_x$ Catalysts |
|---|---|---|---|
| Activity | Good | Good | Excellent |
| Durability | Excellent | Poor | Good |
| Sulfur Tolerance | Good | Poor | Poor |
| Cost | Good | Good | Poor |

It is believed that the carbides, nitrides and borides, and their oxygen containing analogs of the present invention offer the best combination of properties for use in fuel cell powered vehicles.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

What is claimed is:

1. A method for catalyzing a water gas shift reaction in which carbon monoxide levels in a hydrogen-containing stream are reduced, comprising:

providing a catalyst having the formula:

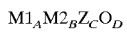

M1$_A$M2$_B$Z$_C$O$_D$ wherein M1 is a transition metal;

M2 is a transition metal;

A is an integer;

B is 0 or an integer greater than 0;

Z is selected from the group consisting of carbon, nitrogen, boron, and combinations thereof;

C is an integer;

O is oxygen; and

D is 0 or an integer greater than 0; and exposing the hydrogen-containing stream to the catalyst for a sufficient period of time to reduce the carbon monoxide levels in the hydrogen-containing stream.

2. The invention according to claim 1 wherein the transition metal comprising M1 does not comprise the transition metal comprising M2.

3. The invention according to claim 1 wherein the molar ratio of M1:M2 is 1 or greater: 0 or greater.

4. The invention according to claim 1 wherein M1 is selected from the group consisting of molybdenum, tungsten, and combinations thereof.

5. The invention according to claim 1 wherein M2 is selected from the group consisting of iron, nickel, copper, cobalt, and combinations thereof.

6. The invention according to claim 1 wherein the catalyst is substantially sulfur tolerant.

7. The invention according to claim 1 wherein the catalyst causes the reaction rate of the water shift gas reaction to increase over time.

8. The invention according to claim 1 wherein the reduction of carbon monoxide levels occur upstream of a fuel cell.

9. The invention according to claim 8 wherein said fuel cell comprises a proton exchange membrane.

10. A method for catalyzing a water gas shift reaction in which carbon monoxide levels in a hydrogen-containing stream are reduced, comprising:

providing a catalyst having the formula:

$$M1_A M2_B Z_C O_D$$

wherein M1 is selected from the group consisting of molybdenum, tungsten, and combinations thereof;

M2 is selected from the group consisting of iron, nickel, copper, cobalt, and combinations thereof;

A is an integer;

B is 0 or an integer greater than 0;

Z is selected from the group consisting of carbon, nitrogen, boron, and combinations thereof;

C is an integer;

O is oxygen;

D is 0 or an integer greater than 0; and exposing the hydrogen-containing stream to the catalyst for a sufficient period of time to reduce the carbon monoxide levels in the hydrogen-containing stream.

11. The invention according to claim 10 wherein the molar ratio of M1:M2 is 1 or greater: 0 or greater.

12. The invention according to claim 10 wherein the catalyst is substantially sulfur tolerant.

13. The invention according to claim 10 wherein the catalyst causes the reaction rate of the water shift gas reaction to increase over time.

14. The invention according to claim 10 wherein the reduction of carbon monoxide levels occur upstream of a fuel cell.

15. The invention according to claim 14 wherein said fuel cell comprises a proton exchange membrane.

* * * * *